(12) United States Patent
Starkey

(10) Patent No.: US 8,883,054 B2
(45) Date of Patent: Nov. 11, 2014

(54) MOLD MONITORING

(75) Inventor: Glenn Starkey, Wauconda, IL (US)

(73) Assignee: Progressive Components International Corporation, Wauconda, IL (US)

( * ) Notice: Subject to any disclaimer, the term of this patent is extended or adjusted under 35 U.S.C. 154(b) by 176 days.

(21) Appl. No.: 13/115,197

(22) Filed: May 25, 2011

(65) Prior Publication Data

US 2011/0316180 A1 Dec. 29, 2011

Related U.S. Application Data

(63) Continuation-in-part of application No. 12/818,684, filed on Jun. 18, 2010.

(60) Provisional application No. 61/268,957, filed on Jun. 18, 2009.

(51) Int. Cl.
*B29C 39/44* (2006.01)
*B29C 45/76* (2006.01)
*B29C 45/17* (2006.01)

(52) U.S. Cl.
CPC .................. *B29C 45/76* (2013.01); *B29C 45/17* (2013.01); *B29C 2045/1796* (2013.01); *B29C 2945/76076* (2013.01); *B29C 2945/76173* (2013.01); *B29C 2945/76254* (2013.01); *B29C 2945/76993* (2013.01)
USPC .......................................... 264/40.1; 425/135

(58) Field of Classification Search
USPC .......................................... 264/40.1; 425/135
See application file for complete search history.

(56) References Cited

U.S. PATENT DOCUMENTS

| | | |
|---|---|---|
| 4,010,679 A | 3/1977 | Dybel |
| 4,588,339 A | 5/1986 | Bilz |
| 4,588,880 A | 5/1986 | Hesser |
| 4,654,512 A | 3/1987 | Gardosi |
| 4,674,053 A | 6/1987 | Bannai et al. |
| 4,720,907 A | 1/1988 | Rapp |
| 4,742,470 A | 5/1988 | Juengel |
| 4,809,426 A | 3/1989 | Takeuchi et al. |
| 4,821,198 A | 4/1989 | Takeuchi et al. |
| 4,856,177 A | 8/1989 | Takeuchi et al. |

(Continued)

FOREIGN PATENT DOCUMENTS

| | | |
|---|---|---|
| CN | 101040735 A | 9/2007 |
| DE | 35 18902 A1 | 11/1986 |

(Continued)

OTHER PUBLICATIONS

MACO 8000 VA-Plastics Manufacturing Control System, pp. 1-11, May 1991.

(Continued)

*Primary Examiner* — Yogendra Gupta
*Assistant Examiner* — Robert J Grun
(74) *Attorney, Agent, or Firm* — Pauly Petersen & Erickson

(57) ABSTRACT

A monitor for maintaining a mold cycle count and other mold operation data and a corresponding system that generates a first remote record of the mold cycle data and a second remote record of the mold cycle data, the second remote record comprising a lesser, different and/or non-confidential version of the first remote record. The first remote record and the second remote record may then be coordinated among an OEM manufacturer, a moldmaker and a molder.

19 Claims, 6 Drawing Sheets

(56) References Cited

U.S. PATENT DOCUMENTS

| | | |
|---|---|---|
| 4,890,306 A | 12/1989 | Noda |
| 4,942,534 A | 7/1990 | Yokoyama et al. |
| 4,964,144 A | 10/1990 | Uchida et al. |
| 5,005,277 A | 4/1991 | Uemura et al. |
| 5,057,000 A | 10/1991 | Mangone, Jr. |
| 5,222,026 A | 6/1993 | Nakamoto |
| 5,257,199 A | 10/1993 | Tsujino et al. |
| 5,344,301 A | 9/1994 | Kamiguchi et al. |
| 5,374,231 A | 12/1994 | Obrist |
| 5,556,582 A | 9/1996 | Kazmer |
| 5,565,854 A | 10/1996 | Kataoka et al. |
| 5,571,539 A | 11/1996 | Starkey |
| 5,692,998 A | 12/1997 | Weigel |
| 5,787,018 A | 7/1998 | Bolan et al. |
| 5,795,511 A | 8/1998 | Kalantzis et al. |
| 5,811,134 A | 9/1998 | Takizawa |
| 6,051,170 A | 4/2000 | Kamiguchi et al. |
| 6,072,146 A | 6/2000 | Matuschek et al. |
| 6,145,022 A | 11/2000 | Takizawa et al. |
| 6,360,136 B1 | 3/2002 | Lamers |
| 6,377,649 B1 | 4/2002 | Stuart |
| 6,381,512 B1 | 4/2002 | Saitou et al. |
| 6,529,796 B1 | 3/2003 | Kroeger et al. |
| 6,585,628 B1 | 7/2003 | Tsung et al. |
| 6,848,895 B2 | 2/2005 | Konishi et al. |
| 7,010,898 B2 | 3/2006 | Michel |
| 7,128,548 B2 * | 10/2006 | Manner .................. 425/135 |
| 7,311,136 B2 | 12/2007 | Manner |
| 7,431,682 B2 | 10/2008 | Zeiler et al. |
| 7,480,542 B2 | 1/2009 | Kroeger et al. |
| 7,580,771 B2 | 8/2009 | Quail et al. |
| 8,025,496 B2 | 9/2011 | Eikenberry |
| 8,047,746 B2 | 11/2011 | Olsson |
| 2004/0121034 A1 | 6/2004 | McBain |
| 2004/0247724 A1 * | 12/2004 | Manner .................. 425/149 |
| 2005/0240303 A1 | 10/2005 | Smith |
| 2005/0283271 A1 | 12/2005 | Dachs et al. |
| 2007/0000154 A1 | 1/2007 | DiBenedetto et al. |
| 2007/0009627 A1 * | 1/2007 | Konishi .................. 425/162 |
| 2007/0066139 A1 | 3/2007 | Roeper et al. |
| 2009/0265958 A1 | 10/2009 | DiBenedetto et al. |
| 2010/0050478 A1 | 3/2010 | DiBenedetto et al. |
| 2010/0320632 A1 | 12/2010 | Starkey |

FOREIGN PATENT DOCUMENTS

| | | |
|---|---|---|
| DE | 39 19699 A1 | 1/1991 |
| DE | 10 2004 052 499 A1 | 7/2006 |
| DE | 10 2006 020 446 A1 | 11/2007 |
| EP | 0 155 662 A2 | 9/1985 |
| EP | 0 365 760 A2 | 5/1990 |
| EP | 0 881 552 A2 | 12/1998 |
| EP | 1 287 959 A2 | 3/2003 |
| EP | 1 369 811 A1 | 12/2003 |
| EP | 1 486 312 | 12/2004 |
| EP | 2 045 067 A2 | 4/2009 |
| GB | 2 161 958 A | 1/1986 |
| GB | 2 336 331 A | 10/1999 |
| GB | 2 426 849 A | 12/2006 |
| GB | 2435189 B | 8/2007 |
| JP | 58-102650 | 6/1983 |
| JP | 60-018870 | 1/1985 |
| JP | 60-127950 | 7/1985 |
| JP | 60-127951 | 7/1985 |
| JP | 61-114831 | 6/1986 |
| JP | 62-015058 | 1/1987 |
| JP | 62-193738 | 8/1987 |
| JP | 63-144934 | 6/1988 |
| JP | 63-185546 | 8/1988 |
| JP | 03-166030 | 7/1991 |
| JP | 5-116129 | 5/1993 |
| JP | 06-004549 | 1/1994 |
| JP | 06-031529 | 2/1994 |
| JP | 06-328458 A | 11/1994 |
| JP | 7-152821 | 6/1995 |
| JP | 2003-200456 | 7/2003 |
| JP | 2003-266498 A | 9/2003 |
| JP | 2006-026865 | 2/2006 |
| JP | 4688445 | 2/2011 |
| KR | 199708249 B1 | 11/1993 |
| KR | 10-0552951 B1 | 2/2006 |
| KR | 10-2009-0004791 A | 1/2009 |
| WO | WO 92/11102 | 7/1992 |
| WO | WO 00/79403 A2 | 12/2000 |
| WO | WO 02/40247 | 5/2002 |
| WO | WO 02/47215 A1 | 6/2002 |
| WO | WO 03/071880 A2 | 9/2003 |
| WO | WO 03/081379 A2 | 10/2003 |
| WO | WO 2004/051857 A2 | 6/2004 |
| WO | WO 2005/001741 A1 | 1/2005 |
| WO | WO 2006/009155 A1 | 1/2006 |
| WO | WO 2006/108978 A2 | 10/2006 |

OTHER PUBLICATIONS

U.S. Doc. No. 7,505,830, dated Mar. 2009, Quail et al.
Mold-Stick, Meusburger EUR 2009, Meusburger Georg GmbH & Co. KG, 2009, 4 pages.
Meusburger inForms Customers & Partners; Magazine for Customers & Partners, Jun. 2009, www.meusberger.com, 4 pages.
Co-pending U.S. Appl. No. 12/818,684; filed Jun. 18, 2010; inventor Glenn Starkey; title Electronic Cycle Counter.
Co-pending U.S. Appl. No. 13/648,931; filed Oct. 10, 2012; inventor Glenn Starkey; title System and Method for Monitoring Tooling Activities.
Chinese Search Report (2 pages) and FANG Xinging, Notification of the First Office Action, Aug. 29, 2013, CCPIT Patent and Trademark Law Office, Beijing, China (11 pages).

* cited by examiner

FIG. 3

| Display Code | Field Name | Details |
|---|---|---|
| None | Total Cycles | This is the total number of times that the plunger was depressed and released since the first time it was depressed, or the life of the counter. |
| CYT | Average Cycle Time | This is the cycle time for the life of the tool (in seconds), taking the total time the counter is active dividing it by the total cycles. |
| CYTR | Average Cycle Time: Recent | A similar calculation to above, but only counts the past 25,000 cycles in terms of the cycle count and time to determine this time in seconds. |
| ACT | Activity Percentage | For the life of the tool, this calculates how much the tool is active based on the total available time it could be active. The calculation is Up Time/(Up Time + Idle Time), shown as a percentage, and does not take into consideration any 'down time' beyond 6 hours. |
| ACTR | Activity Percentage: Recent | A similar calculation to above, this gives the activity percentage based on the past 25,000 cycles only. |
| RES | Resettable Count Meter | By pressing and holding the button down for 5 seconds, the display will blink. Then, while continuing to press it, the count will reset to 0 in this field. This allows for a short count of cycles, similar to a trip odometer in a car. |
| BAT | Battery Level | This displays the percentage of battery life. When the level drops down to below 5%, the unit will continue to function and data can be retrieved via the USB. But, the battery must be replaced at that time. (Expected life of the battery is 50,000 hours.) |

| Mold Performance Summary | | | | | |
|---|---|---|---|---|---|
| Mold No. 2155 | Description: 2" Seal Nut | | | Report Date: 4-May-2010 | |
| Target Activity % | 95.0% | Target Cycle Time | 14.0 | Hours Active in Press | 4,621 |
| Last Full Month Activity % | ◆ 90.4% | Last full month Cycle Time | ●15.0 | Hours Idle in Press | 360 |
| Life-to-date Activity % | ▲ 92.8% | Life-to-date Cycle Time | ●15.3 | Hours in Sleep Mode | 1,335 |
| Target Maint. Interval | 500,000 | Life-to-date Total Cycles | 1,104,829 | Life-to-date Hours in Press | 4,981 |

FIG. 4

MOLD MONITORING

CROSS REFERENCE TO RELATED APPLICATIONS

This application is a continuation-in-part of U.S. patent application Ser. No. 12/818,684, filed on 18 Jun. 2010, which claims the benefit of U.S. Provisional Patent Application Ser. No. 61/268,957, filed on 18 Jun. 2009.

BACKGROUND OF THE INVENTION

1. Field of the Invention

The present invention relates to a mold monitoring system.

2. Discussion of Related Art

Injection molds were in the past permitted to run in the press for very long part runs; and the mold was seldom removed from the press for storage. In these past systems, the molds were continuously associated with the press so that cycle counters on the press itself could be relied upon to provide the number of cycles of the mold and this was used to provide information relative to preventative maintenance, such as cleaning of the mold or lubricating critical surfaces.

Contemporary manufacturers utilize "just-in-time" practices wherein the purchaser does not maintain an inventory of large quantities of plastic parts, but manufactures the parts in smaller batches to be delivered on an "as-needed" basis. Such just-in-time practices may require molds to be swapped in and out of the press to produce different parts on an as-needed basis. As a result, press cycle counters which count the number of cycles of the press, can no longer be relied upon for maintenance schedules because a series of different molds is used in the press for relatively short periods of time.

Currently, records may be kept as to when and how long a particular mold has been run using mechanical counters that are affixed to the respective molds. Such mechanical counters include the COUNTERVIEW® cycle counter manufactured by Progressive Components International Corporation of Wauconda, Ill. Starkey, U.S. Pat. No. 5,571,539 is incorporated herein by reference and teaches one such mechanical counter. Such mechanical counters reveal a running tally of the number of cycles that a particular mold has run but little else about the manufacturing process.

Mechanical counters such as the COUNTERVIEW® cycle counter may positively monitor mold activity and validate process monitoring data. In addition, a serial number may be physically affixed to a surface of the COUNTERVIEW® cycle counter for association between the cycle counter and the particular mold. As a result of the association between the cycle counter and the mold, a manufacturer may then monitor mold data and thereby improve mold maintenance.

Such mechanical counters may be susceptible to physical tampering and also may result in inaccurate record keeping because of the reliance on human operators to verify and transcribe mold cycle counts and/or serial numbers. Improper or infrequent record keeping associated with a particular mold may have negative effects on the maintenance of the mold and/or maintaining a desired inventory of resulting parts. Obviously, without the proper maintenance of an injection mold, damage may occur and down time may also be the result. Likewise, failure to maintain a desired inventory of parts may have serious consequences on resulting production.

Thus, there remains a need for an improved cycle counter and manufacturing monitor and an improved method for tracking and/or reporting manufacturing parameters and practices.

SUMMARY OF THE INVENTION

In accordance with the present invention, an injection plastic mold or similar actuating manufacturing tool is provided with a monitor, which is actuated with each opening and closing cycle of the mold to maintain a count of the operating cycles performed, as well as additional information about the mold and its operation. The monitor is preferably relatively inexpensive and unobtrusive and capable of withstanding severe environments including extreme temperatures and shock that may be encountered in a molding operation. This information is maintained or associated with the monitor in the mold, whether the mold is on the press or a storage rack, and may be retrieved remotely or directly from the monitor. In addition, the information generated by the monitored may be allocated among the OEM manufacturer, the moldmaker and the molder as desired by the owner of the tool and several reporting options are available for this purpose.

Other features and advantages of the invention will be apparent from the following detailed description taken in conjunction with the following figures, wherein like reference numerals represent like features.

BRIEF DESCRIPTION OF THE DRAWINGS

FIG. 3 shows various information sets as shown on a display of the monitor according to one preferred embodiment of this invention;

FIG. 4 shows a sample historical record generated by software used in association with a monitor according to one preferred embodiment of this invention;

DETAILED DESCRIPTION OF THE PREFERRED EMBODIMENT

Figure 1:
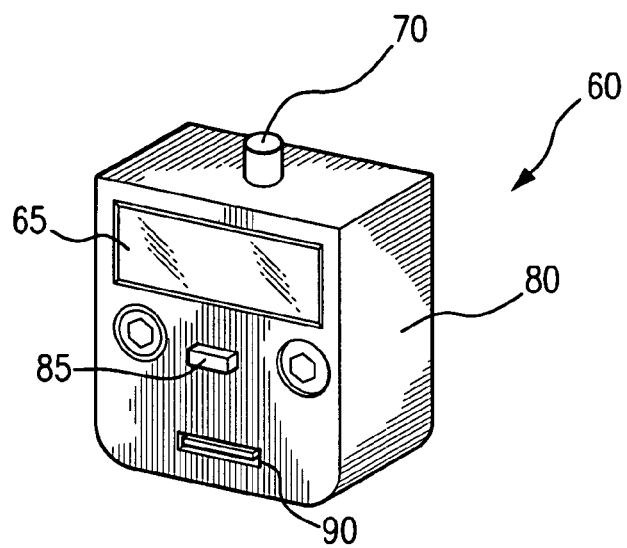
FIG. 1 shows a monitor according to a preferred embodiment of this invention.
Figure 2:
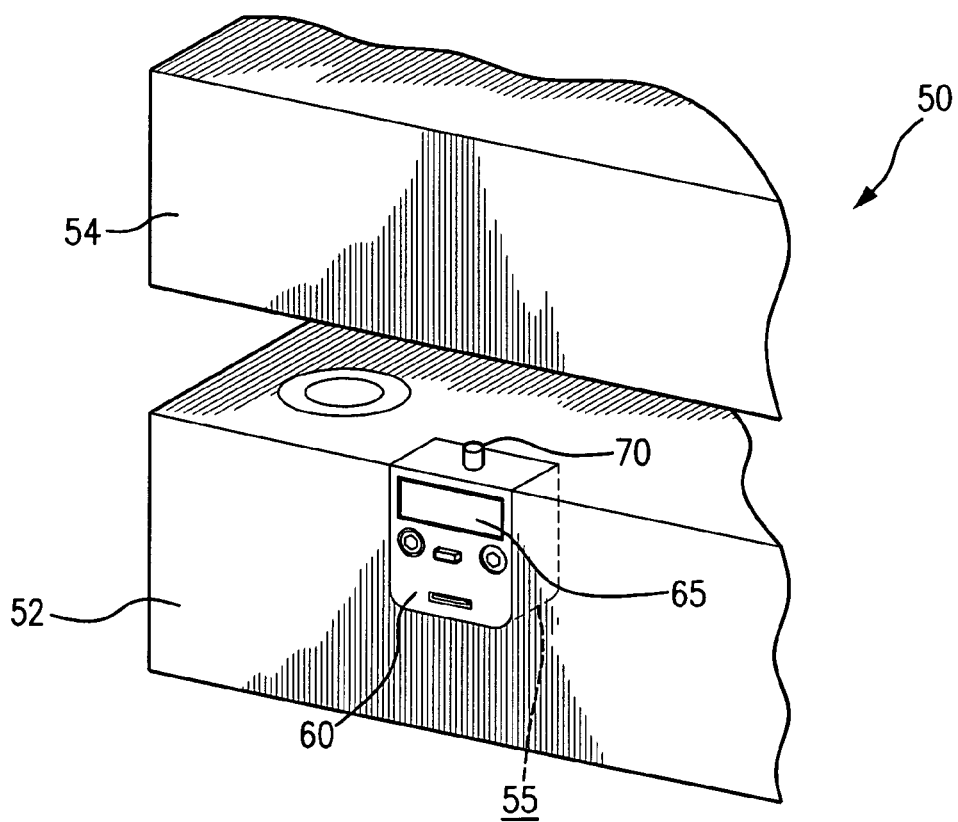
FIG. 2 shows a monitor placed within a mold according to one preferred embodiment of this invention.

As shown in FIGS. 1 and 2 for purposes for illustration, a monitor 60 is used in connection with a mold 50. As shown in FIG. 2, the mold 50 includes a first mold half 52 and a second mold half 54. The first mold half 52 and the second mold half 54 preferably reciprocate relative to each other to result in closure of the mold 50, the molding operation and a resulting molded component. For instance, the first mold half 52 may be mounted for reciprocal movement on four posts which are stationary or fixably mounted at their ends to the second mold half 54 and the first mold half 52 may be closed relative to the second mold half 54 to complete a typical molding cycle within a molding press.

The term "mold" as used herein refers to mold bases or frames sold by mold manufacturers without the final cavity therein, as well as refers to molds that actually have the cavities therein. Thus, it is contemplated that a mold base or, frame may be sold with a monitor or counter therein prior to actual cavity being formed. Similarly, although plastic injection molds are shown and described by example, the monitor 60 may be used in connection with any reciprocating, molding or cycling manufacturing equipment including but not limited to blow molding, stamping, die casting, etc.

According to a preferred embodiment of this invention, the mold 50 is provided with the monitor 60. The monitor 60, which may also be referred to as "counter" herein, preferably includes an actuator 70. The actuator 70 is preferably triggered with each opening and closing movement of the mold 50 when it is in an injection molding press. The actuator 70 may comprise a mechanically and/or an electrically and/or magnetically actuated switch that registers following every actuation of the mold 50 within the molding press. According to one preferred embodiment, the actuator 70 is preferably positioned to generate and send a count signal following a mold operation.

According to one preferred embodiment, the actuator 70 is positionable between a released mode, such as when the mold 50 is open, and an activated mode, such as when the mold 50 is closed. The duration of both the released mode and the activated mode may be trackable and recorded by the monitor 60.

The monitor 60 preferably includes a housing 80 that is molded and/or otherwise formed into a body that is compatible with a pocket 55 or similar accommodation within the mold 50. The housing 80 is preferably formed of a rigid, sealable and/or enclosed body for substantially enclosing and protecting the internal electronics and devices of the monitor 60.

Preferably, an outer wall of the monitor 60 is substantially flush with an upper surface of either the first half 52 or second half 54 of the mold 50. In this manner, the actuator 70 may be engageable with a surface of an opposite second half 54 or first half 52 of the mold 50. As described above, the engagement may occur mechanically with a portion of the actuator projecting above the upper surface or otherwise through a magnetic and/or electrical engagement and actuation.

The monitor 60 additionally includes an internal power supply, such as a battery. The battery is preferably sealed within the housing 80 and therefore tamper resistant. According to one preferred embodiment of this invention, the battery is a ½ AA. It is contemplated in one preferred embodiment of this invention that the battery is not accessible following placement of the monitor 60 within the mold 50. As such, an extended battery life is a desired feature of the present invention.

Figure 6:
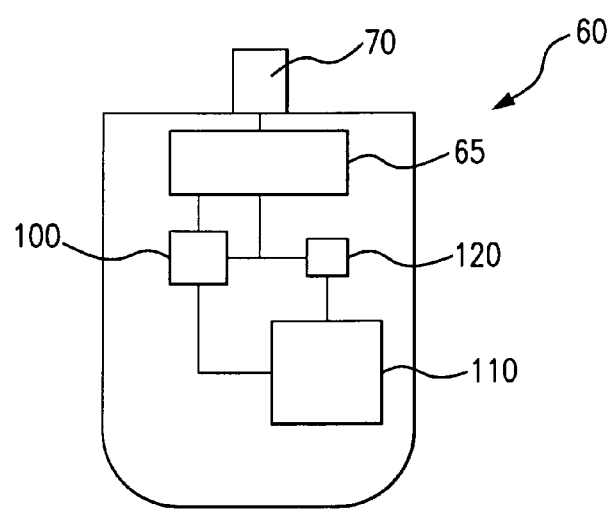
FIG. 6 shows a schematic of a monitor according to one preferred embodiment of this invention.

In addition, and as shown schematically in FIG. 6, the monitor 60 preferably includes a processor 100 within the housing 80. A processor 100 is preferably positioned with respect to the housing 80, and preferably sealed therein. The processor 100 preferably comprises a generally compact or micro device that converts an input to an output, such as a CPU and associated memory, as described in more detail below.

A non-transitory, computer readable medium 110, such as an internal memory, is preferably positioned within the housing 80 and is electronically connected with the processor 100, the actuator 70, and, preferably, an electronic display 65. As described, the actuator 70 preferably tracks cycle count and sends a count signal to the processor 100. Using cycle count information from the actuator and time information sent from the timer 120, the processor 100 generates average cycle time and the activity percentage of the mold 50. The computer readable medium 110 then stores the mold data, including, but not limited to, total count, the average cycle time and the activity percentage of the mold. This data is preferably retained independent of a malfunction by the mold 50 and/or the monitor 60. In this manner, the cycle and other information is retained when the mold 50 is removed from the molding press and moved to a new molding press or stored during downtime.

The monitor 60 according to this invention preferably tracks one or more of the following sets of information: Total Cycles; Total Time; Active (Up) Time; Idle Time; Idle Time Total; Active (Up) Time Average; Sleep Time; Sleep Time Total; Cycle Time; Average Cycle Life to Date; Average Cycle Recent; Activity Percentage; Activity Percentage Recent; Resettable Trip Count; Down Days; Days Initiated; Battery Level; Segment Time; Device ID; Mold ID; and/or PM Cycles. Each of these categories will be described in more detail in the following discussion.

Total Cycles includes the cycle count as described above. A cycle is generally defined as the opening and closing of a tool that creates a pulse by the actuator 70. That is, every actuation of the mold results in an additional cycle count. Such Total Cycles is important when tracking maintenance requirements for the particular mold 50 to which the monitor 60 is associated. The Total Cycles are also applicable to inventory management and/or manufacturing analysis.

In addition, the monitor 60 may further generate an Interim Cycle Count in addition to a Total Cycle count. A user may temporarily reset the Total Cycle count to obtain an temporal or interim cycle count during an interim molding cycle. The monitor 60 preferably also includes an internal clock or timer 120 to time a molding cycle and a means to provide an average production cycle time for the molder. The timer 120 is preferably electronically connected with the processor 100. In this manner, Average Cycle Time may be measured which may account for an average cycle during a specified time period, for instance, an average cycle time since the mold 50 was most recently placed into service. The Average Cycle Time preferably includes the total time the mold was active divided by the total cycles. Preferably the active time does not include time that the mold was intentionally idled, or sleep time, which is described in more detail herein. In addition, an Average Cycle Life to Date may be calculated which determines an average cycle time from the first operation of the mold 50, or more specifically, an average cycle time since the monitor 60 was first associated with the mold 50. In addition, a Days Initiated or similar time interval since inception or "date of birth" may be tracked to determine the total service time of the mold 50, associated with the respective monitor 60.

The timer 120 preferably further includes an active mode and a sleep mode depending on the state of operation of the associated mold 50. Specifically, during generally constant operation of the mold 50, the timer 120 preferably maintains the active mode. However, should the mold 50 discontinue operation for a predetermined period of time, for instance, six hours, or any other suitable time increment indicating discontinuance of ordinary molding operations, then the monitor 60 enters sleep mode.

The timer 120 may further record and track the total duration of each of the released mode and the activated mode of the actuator 70, as described above. The actuator 70 may thereby generate and send a release signal when the mold is open and generate and send an active signal when the mold is closed. The processor 100 preferably receives these signals and then tracks a duration of time of each of the release signal and the active signal. Such measurements may be used in the calculation of various data fields including activity percentage and average cycle time.

According to a preferred embodiment of this invention, the monitor 60 may additionally include an internal date or calendar so that the date of usage of the mold 50 and/or placement into service may also be stored and retrieved. Alternatively, the user can record a service entry date and use the internal clock described above to count from the service entry date as a baseline and therefore constructively maintain day and date interval counting. In this manner, the monitor 60 may record Idle Time or Down Days or similar downtime information. Likewise, operation time may be compared with downtime and/or sleep time to reach an Activity Percentage. Activity Percentage is defined generally as for the life of the mold, the time that the mold is active based on the total available time it could be active. The calculation is generally up or active time divided by up or active time plus idle time. According to a preferred embodiment, the processor 100 discards idle time of the mold in excess of a predetermined limit (sleep time) to determine an Activity Percentage. In this regard, the timer 120 preferably activates the sleep mode following mold inactivity exceeding a predetermined threshold, such as six hours.

The monitor 60 may further record an in-service or "born-on" date based on when a battery is inserted and the monitor 60 is turned on for the first time. As a result, the monitor 60 preferably records and provides the time and/or dates on which the mold 50 was placed into production and the associated Total Cycles for this usage period. In this manner, a history may be developed to readily determine important manufacturing information about the mold 50.

According to a preferred embodiment of this invention, the monitor 60 may further include a display 65, such as an electronic display positioned with respect to the housing 80, for example an LED or LCD display that provides one or more of the preceding or following data categories. Such data categories are preferably shown on the display 65 in a readily viewable manner, such as in sequence, either automatically or by a function button that permits a user to scroll through such data categories. FIG. 3 is exemplary of such data categories that may be viewable on the display 65. The function button is preferably positioned in an outwardly exposed, prominent portion of the housing 80 and electronically connected with the display 65 and the processor 100 to generate one or more preferred data categories.

According to a preferred embodiment of this invention, a default setting of the display 65 includes a powered-off or blank display, that is, an absence of any data categories thereby conserving the battery or other power supply within the monitor 60. In such a default setting of the display 65, the Total Cycles is preferably most readily accessible to a user, either on an automatic periodic basis or through actuation of a function button on the monitor 60.

Although the monitor 60 is capable of real-time counting and display, a battery conserve state may keep the display screen off as the monitor 60 is actuated, for instance as a magnet engages a surface of the monitor 60. The display 65 in such a battery conserve state may update in predetermined increments, depending on the cycle time or the intentions of the user. The sleep mode and the battery conserve state may be coordinated or separate operational, modes of the monitor 60. In addition, a user interface, such as a function button on the monitor 60 may permit the user to view an actual datapoint in realtime, regardless of a particular current mode of the monitor 60, including a moving counter after the monitor 60 is placed into the mold 60.

According to one preferred embodiment of the invention, a default display interface will include: Total Cycles; Average Cycle Recent; Average Cycle Life to Date; Days Initiated; Idle Time Total; Activity Percentage; Battery Level Percentage; and Device ID. FIG. 3 shows an example of displays showing representative outputs.

According to a preferred embodiment of this invention, a Battery Level and/or Battery Level Percentage may be included in the information available from the monitor 60. The Battery Level may be shown on display 65 or, like all data categories described herein may be tracked and displayed periodically and/or in real time on an external display that is connected to or connectable with the monitor 60.

According to a preferred embodiment of this invention, a Segment Time may be set and/or adjustable within the monitor 60. The Segment Time is preferably the interval in which the monitor writes data to internal storage, such as the internal memory. This Segment Time may or may not correspond with a time to sleep mode described herein. For instance, a battery conservation mode of the monitor 60 may write gathered data to storage, such as internal memory every 120 minutes. In this manner, battery life may be further conserved by minimizing the activity required of the monitor 60 during operation of the press. According to a preferred embodiment, the monitor 60 can maintain multiple segments, for instance eight segments or sessions. In this embodiment, when a ninth session is initiated, the first or oldest session is preferably overwritten. The monitor 60 may be programmed to permit any desirable number of segments or sessions.

The monitor 60 may additionally include an on/off switch. However, such on/off switch may solely be associated with the display and preferably does not prevent the recording and collection of any category of data described herein.

In addition, a Device ID and a Mold ID may be programmed into the monitor 60. In this manner, a user can maintain a positive connection between the mold 50 and the monitor 60 to ensure that the gathered data is correctly assigned to the intended mold 50 and/or press.

According to one preferred embodiment of this invention, Preventative Maintenance ("PM") Cycles and/or a countdown to scheduled PM may additionally be included as a data category in and/or from the monitor 60. Preferably, when the mold 50 has been cycled through to the desired PM Cycles and/or scheduled PM date, an alarm or indicator is triggered to alert the user that mold maintenance is required. Such an alarm or indicator may be external to the monitor 60, such as a flashing warning, or may be external coupled with the monitor 60 such as a warning light on the press containing the mold 50.

With the one or more collections of the foregoing information, an OEM manufacturer, molder and/or moldmaker can create a history of the operation of the mold including the number of specific parts made, the date of manufacture, average cycle time and/or other information so as to provide a better history with respect to when maintenance should be made and what type of maintenance should be used. Examples of such histories or reports are shown, by illustration, in FIGS. 4 and 5.

According to a preferred embodiment of this invention, the monitor further includes a port 90 positioned within the housing 80 and electronically connected with respect to the non-transitory computer readable medium 110. The port 90 is preferably connectable to an external computer. The port 90 may comprise a USB port for connecting the monitor 60 to a computer, printer, PDA or similar device so that the history and average cycle time and/or total cycles as well as any stored maintenance information may be read, recorded and/or offloaded.

According to one preferred embodiment of this invention, information is exported into an internal and/or external memory of the monitor 60 in predetermined intervals. Included in such information is the mold downtime. For instance, assuming no molding cycle is over 200 seconds, the monitor is triggered to begin counting downtime. Information is preferably written in increments, for instance, two hour increments. Such incremental recording of downtime and/or data storage assists in maintaining a long term battery life for the monitor 60.

The monitor 60 preferably operates in connection with bridge software to write the collected information to the internal and/or external memory of the monitor 60 and then permit retrieval of the collected information.

As described, a port 90, such as a USB port, a bluetooth interface and/or other wired or wireless connection may be used to connect with a storage device or a readout device, such as a local or networked computer, an internet site, a handheld, readout device or similar output device. The associated device may also be used to input information into the internal and/or external memory of the monitor 60 with respect to a particular desired setting, preventive maintenance operation or other data or operation so that the mold 60 includes an intended protocol or history of what maintenance has been accomplished or needs to be done.

Figure 5:
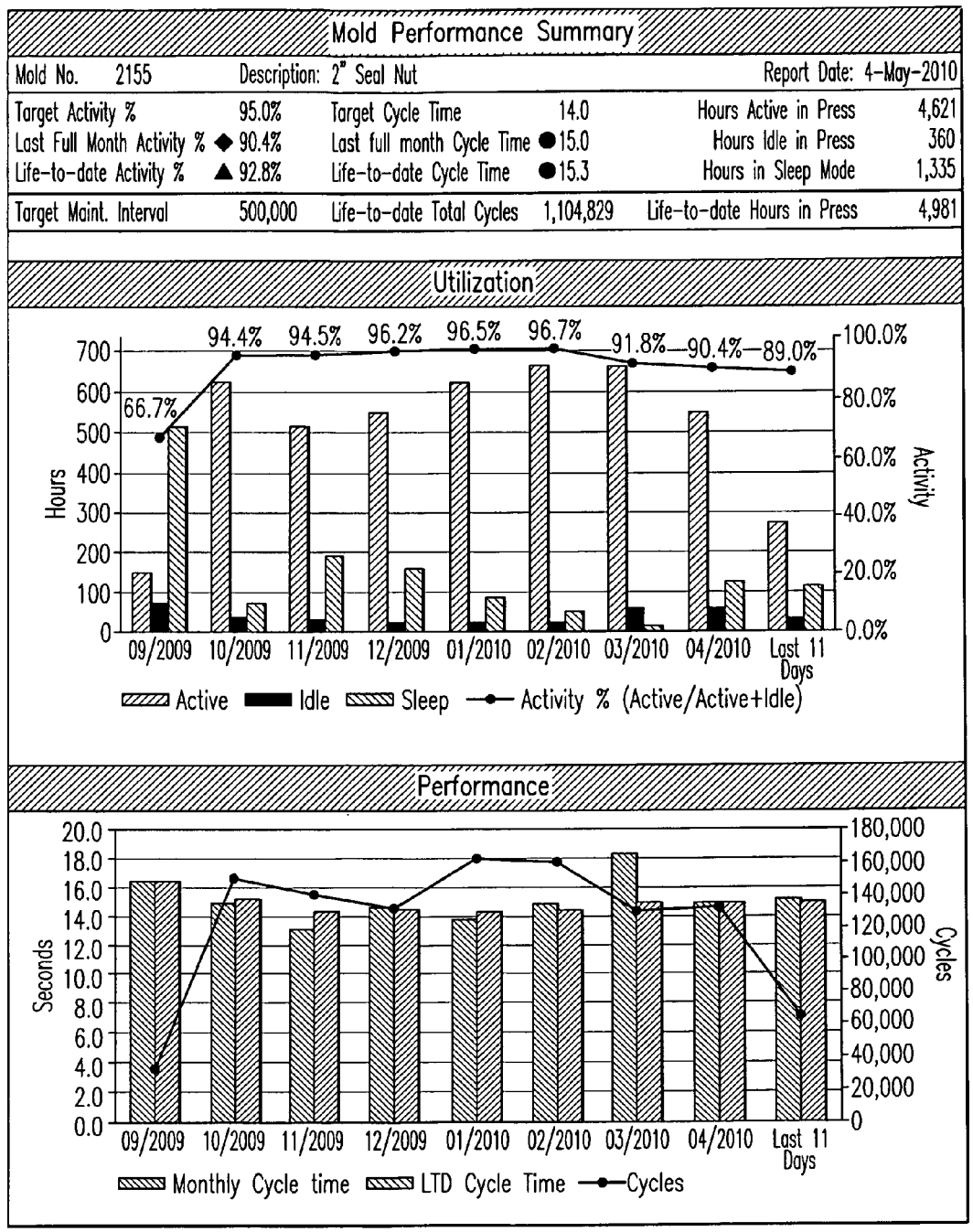
FIG. 5 shows a sample report generated by software used in association with a monitor according to one preferred embodiment of this invention.

According to one preferred embodiment of this invention, representative reports derived from the monitor 60 are shown in FIGS. 4 and 5. Such reports may be prepared in real time or in increments on schedule. The monitor 60 as described may also permit remote access to tool information for remote tracking and data analysis by the mold builder, the mold operator and/or suppliers or customers in the manufacturing supply chain. Such remote access may permit resupply of maintenance items as well as just-in-time scheduling. Essential information regarding the mold or group of molds may be organized, updated and stored including part name, part id, mold id, number of cavities, etc. Status of multiple mold groupings may be tracked to consolidate information regarding a specific product's tooling program. Alerts may be provided on the mold and/or in the various reports that indicate inactivity affecting product launch or inventory requirements. Such alerts may be provided to the molder, mold operator, moldmaker and/or program managers through a personal computer, smart phone or similar delivery system.

The monitor 60 as described provides numerous benefits to users including access to actual manufacturing information maintained in real time, better documentation of systems, repeatability and tracing. Manufacturing assets may be better and more accurately tracked and real time "post mortem" information is available should a tool or press unexpectedly cease operation. Likewise, process parameters are readily accessible and preventative maintenance schedules are readily viewable, budgetable and predictive. In addition, users are aware of mold usage, can improve scheduling capability, capacity utilization and can store and view auxiliary equipment notes.

In this regard, the monitor 60 may include a serial number physically affixed to a surface of the housing 80 for association between the monitor 60 and, the particular mold 50. As a result of the association between the monitor 60 and the mold 50, a manufacturer may then monitor mold data and thereby improve mold maintenance. Specifically, for example, a user may enter the serial number of the particular monitor 60 into an electronic database or website, such as www.profilecv-.com, and track the particular performance of the mold 50 associated with that monitor 60. If no data exists for the particular monitor 60, the user may be provided with an overview of available information for the monitor 60 and/or mold 50. Data similar to that shown in FIGS. 4 and 5 may then be available, on a remote but secure basis.

In addition, according to one preferred embodiment of this invention, the monitor 60 and/or related software may include sufficient memory to permit on-mold storage of piece part or mold prints, files, manufacturing specifications and other critical data related to the part to be manufactured and/or the mold. In addition, a GPS or RFID may be provided within or in association with the monitor 60 to permit location tracking of the mold. Further, mold diagnostic and telemetry sensors and equipment may be connected with respect to the monitor 60 to provide temperature monitoring and similar information in association with the reports discussed herein.

Accordingly, a method for retrieving mold cycle data in accordance with the subject invention includes positioning the monitor 60 with respect to the mold 50; recording a number of cycles generated by the mold 50; recording a time that the mold is in operation (or active); recording a time that the mold is not in operation (or idle or in sleep mode); and generating an average cycle time and an activity percentage of the mold 50. The subject method may or may not include the monitor 60 entering a sleep mode following mold inactivity exceeding a predetermined threshold. According to one embodiment, the following data is gathered and/or calculated by the monitor 60.

| Abbreviation | Definition | Details |
| --- | --- | --- |
| TC | Total Cycles | The total cycles, or times the monitor was depressed and released, or "plunged." |
| TS | Total Seconds | The total time in seconds that were expended since the first plunge, or the 'age' of the monitor. |
| UT | Up Time | The time in seconds that the counter was plunging/activating. |
| IT | Idle Time | Idle time is when the mold is in the press but is not plunging or active. After 200 seconds, Idle Time starts - and continues until the mold activates again OR 6 hours of time is reached - which constitutes Sleep Time. |
| ITT | Idle Time: Total | The sum of all the Idle Times recorded previously. |
| UTT | Up Time: Total | The sum of all the Up Times recorded previously. |
| ST | Sleep Time | Once the counter is sitting idle for 6 hours, that time from the 200 second point through the 6 hour point - and any time further until the counter activates again - is considered Sleep Time. |
| STT | Sleep Time: Total | The sum of all the Sleep Times recorded previously. |
| CYT | Cycle Time | The Cycle Time recorded for the life of the tool, same as on the display. |
| CYTR | Cycle Time: Recent | The Cycle Time for the past 25,000 cycles. |
| ACT | Activity Percentage | Activity Percentage for the life of the mold. |

-continued

| Abbreviation | Definition | Details |
|---|---|---|
| ACTR | Activity Percentage: Recent | Activity Percentage based on the past 25,000 cycles. |
| RES | Reset Count | If the 'trip meter' or interim cycle counter was used for the monitor, the last recorded value of that reset number is listed. |
| BAT | Battery Level | The percentage of battery life. |
| ID | Counter Identification | Each monitor will have a unique ID for the internal mechanics/software, which is different than the serialization on the front face of the monitor. |
| CD | Cycle Difference | This is a mathematical field that calculates the total cycles from the current session minus the cycles from the last session. |

From the foregoing, it is seen that there is provided a device which serves as a monitor and/or counter for an injection mold, stamping dies, similar mold and/or similar reciprocating tooling which is relatively inexpensive and yet generates an accurate history of the extent and usage of the mold for particular molded parts. Preferably, the monitor is more sophisticated than a simple counter and records therein mold identification information, part identification information, average cycle time information as well as actual dates and quantities of parts molded over particular times. The invention is particularly useful in that accurate information is retained about the usage of the mold and timely, proper maintenance can be more readily facilitated.

As described in more detail as follows, the subject monitor 60 may be offered by a manufacturer or distributor to a moldmaker that manufactures, injection molds or similar reciprocating tooling to a predetermined specification; a molder that manufactures plastic or stamped parts from the tooling to a predetermined specification; and/or an OEM manufacturer that provides desired parameters and specifications to the moldmaker and/or the molder. In addition, a molding coordinator may coordinate the mold construction and components as well as the molding process and parameters on behalf of the OEM and/or other parties.

According to a preferred system utilizing the monitor 60, a moldmaker (for instance, ABC Mold) may purchase the monitor 60, resulting in logging a Customer Name, a Device ID, and a Date into an electronic database, such as MicroSoft Excel, within a network file storage and/or a local file storage. The moldmaker may additionally provide the molder recommended maintenance increments as part of a mold warranty.

A molder (for instance, XYZ Molding) utilizing the monitor 60 within a mold may wish to connect to the monitor 60 either as part of maintenance requirements, or for a general query or program related to mold performance. This access may be coordinated through an OEM manufacturer/owner of the tooling or may be separately accessible. After loading the software, the molder will contact the seller of the monitor 60 or the molding coordinator to receive a password and/or access code. The molder will then enter a unique access code and read and accept a Terms and Conditions document for access to the data generated and maintained by the monitor 60. Following acceptance of the Terms and Conditions, the molder, XYZ Molding, can pull data from the monitor 60 during operation.

When the molder synchronizes the monitor 60, an email with the Device ID activity log is preferably automatically sent to an e-mail address maintained by a molding coordinator, where it will reside generally without oversight. The seller of the monitor will preferably not have realtime access to the e-mails and the data therein.

If the buyer of the monitor 60, in this example, the moldmaker ABC Mold, receives the mold back from the molder XYZ Molding, the moldmaker will have the ability to check various performance parameters tracked by the monitor 60. In such a way, the moldmaker can confirm that the molder operated the mold under the intended parameters, including recommended maintenance measures and, intervals, and in accordance with the quoted cycle times and cycles. As a result, if the mold was abused or otherwise used outside of quoted parameters, the moldmaker may be able to address any such discrepancies with the molder and thus repairs and/or maintenance may be properly attributable to the responsible party.

In the unlikely event that the monitor 60 is dead or otherwise inactive, either through deliberate action or otherwise, the moldmaker may contact the molding coordinator for limited access to the gathered data. Because there was an initial log of the Purchaser and Device ID, the molding coordinator can verify that the user is legitimate, and forward the activity log to the contact at the molder, ABC Mold. If the mold was run at more than one location, there will be activity logs for each location and the molding coordinator would forward these to the purchaser, such as the moldmaker.

The above scenario is generally applicable for the moldmaker/molder business relationship, referred to as the "M" version of this system. In this scenario, the backed-up data is generally not strategic nor sensitive. Specifically, general molding data would be available without specificity as to production details. For instance, a general part number, cycle time and quantity may be retrievable but not specifics regarding the part name, function, efficiencies and other details germane to the overall molding program. The molding coordinator would charge a nominal fee for generating a suitable generic report to the purchaser.

Another scenario generally involves an OEM manufacturer, such as an automotive company or handset manufacturer, referred to as the "O" version of the described system. In the "O" version of the system, the OEM manufacturer contracts with a molding coordinator to install "System Monitoring." System monitoring preferably includes monitors 60, related software to the OEM's molders and/or moldmakers, and periodic audits of not only mold activity (maintenance) but also mold performance (speed, efficiency). This data is extensive and may often be deemed sensitive, but the OEM manufacturer has an interest and a right to require transparency throughout the supply chain. In this scenario, the molder, XYZ Molding, may do the initial purchase of the device, or may have purchased the mold from a moldmaker, ABC Mold. When XYZ Molding is synching the monitor at various manufacturing increments, their local hard drive will include reports saved for their own use to improve efficiencies. In addition, the molding coordinator will preferably provide periodic reports (for example, twice monthly) to the OEM manufacturer for the OEM manufacturer's molds, by compiling the data that is emailed to the molding coordinator automatically at the synchronization of the monitor 60. In this scenario, the molder, ABC Mold, would still have a right to audit the Activity Log, through the molding coordinator, but would not have the ability to access detailed performance reports. At the OEM manufacturer's election, the molder, ABC Mold, can buy and install the monitor 60 at the outset and then obtain access to this information.

Figure 7:
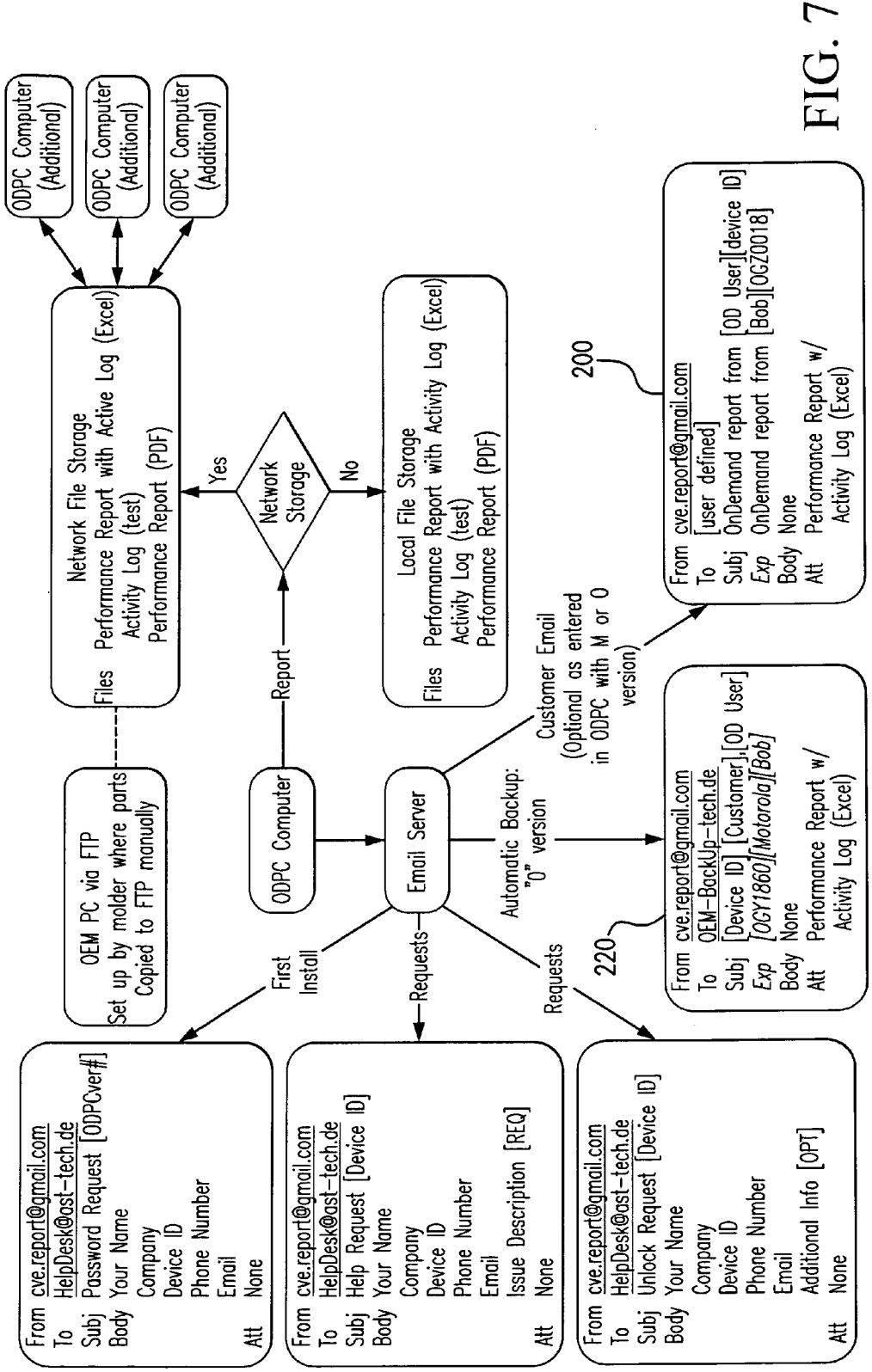
FIG. 7 shows a flowchart of a method for monitoring molding processes according to one preferred embodiment of this invention.

FIG. 7 shows a flowchart of a preferred method for monitoring a reciprocating tool that includes assigning an electronic monitor to a particular reciprocating tool as described above. Specifically, as best shown in FIGS. 1 and 2, the electronic monitor 60 is positioned within the reciprocating tool, such as mold 50, to record a count signal following each operation of the mold 50.

As shown in FIG. 7, an automated first remote record of the operation of the reciprocating tool is maintained preferably through a customer e-mail, as shown in element 200. This first remote record 200 may be any number of the operation parameters described herein and may be specifically tailored to the customer by the distributor and/or the molding coordinator. In addition, an automated second remote record 220 of the operation of the mold 50 is generated. In this operation, the second remote record 220 preferably includes a "stripped-down" version or variation of the first remote record 200, preferably having less detail than the first remote record 200. According to one preferred embodiment of this invention, the second remote record 220 includes a non-confidential version of the first remote record 200. Alternatively, the second remote record 220 may include different information from the first remote record 200. In theory, the first remote record 200 may include all the mold data collected and available by the monitor 60 while the second remote record 200 includes some limited subset of the first remote record 200. Additional records and/or reports may also be produced as desired, including maintenance records and/or reports or very general reports for more general audiences.

As described above, the first remote record may be provided to an operator of the reciprocating tool and the second remote record may be provided to a builder of the reciprocating tool, or vice-versa. In this manner, the tool owner, such as an OEM manufacturer, can control the information provided to the various manufacturing partners without providing a potentially confidential overall picture of the molding operations. For example, a molder in China can pull information, in the form of a remote record, from the reciprocating tool in real time while the OEM manufacturer receives a secure e-mail provided either the same information or a desired variation of the information.

A third party molding coordinator may alternatively or additionally, coordinate the operation of the reciprocating tool among an OEM manufacturer, a moldmaker and a molder. The molding coordinator may allocate (provide or withhold) at least one of the first remote record and the second remote record to the moldmaker and/or the molder based upon parameters determined by the OEM manufacturer. For example, an activity report may be generated from the second remote record and provided to the moldmaker only following a request from the OEM manufacturer.

In each described case, the first remote record and/or the second remote record may be remotely accessed by one or more of the various parties through network file storage, local file storage, e-mail servers, hard reports or other methods, such as shown in FIG. 7. In addition, such access is preferably secured access which may be provided only to the desired and intended party or parties.

While specific embodiments have been illustrated and described, numerous modifications come to mind without significantly departing from the spirit of the invention and the scope of protection is limited by the scope of the accompanying claims. These modification include, but are not limited to, replacing other types of cycle counters with cycle counters made according to the present invention and or retrofitting other types of cycle counters using the principles of the present invention.

The invention claimed is:

1. A method for monitoring a reciprocating tool comprising:
   assigning an electronic monitor to a particular reciprocating tool;
   positioning the electronic monitor within the reciprocating tool to record a signal following each operation of the reciprocating tool;
   maintaining a remote record of the operation of the reciprocating tool, maintaining an automated second remote record of the operation of the reciprocating tool, and the second remote record being a non-confidential version of the remote record by having less detail than the remote record.

2. The method of claim 1 further comprising the steps of:
   providing the remote record to an operator of the reciprocating tool; and
   providing the second remote record to a builder of the reciprocating tool.

3. The method of claim 1 further comprising the steps of:
   coordinating the operation of the reciprocating tool among an OEM manufacturer, a moldmaker and a molder; and
   providing at least one of the remote record and the second remote record to one of the moldmaker and the molder based upon parameters determined by the OEM manufacturer.

4. The method of claim 1 further comprising:
   providing remote access of the remote record to a manufacturer.

5. The method of claim 1 further comprising the step of:
   maintaining an active mode and a sleep mode with the electronic monitor to calculate an activity percentage wherein the electronic monitor discards downtime of the reciprocating tool in excess of a predetermined limit to reach the activity percentage.

6. The method of claim 1 further comprising the step of:
   storing a total count, an average cycle time and an activity percentage of the mold at a remote location from the operation of the reciprocating tool.

7. The method of claim 1 wherein at least one of the remote record and the second remote record are maintained as an e-mail or a database file.

8. The method of claim 1 wherein the second remote record includes different detail than the remote record.

9. The method of claim 1 wherein at least one of the remote record and the second remote record require secured access.

10. A method for maintaining mold data from a reciprocating tool, the method comprising:
    positioning a monitor with respect to the reciprocating tool;
    recording mold date from the reciprocating tool;
    generating a first remote record of the mold data; and
    generating a second remote record of the mold cycle data, the second remote record comprising a non-confidential version of the first remote record.

11. The method of claim 10 wherein the mold data comprises at least one of a number of cycles generated by the reciprocating tool, an average cycle time and an activity percentage of the reciprocating tool.

12. The method of claim 10 further comprising:
allocating the distribution of the first remote record and the second remote record to one or more appropriate recipients.

13. The method of claim 12 wherein the one or more appropriate recipients comprise at least one of an OEM manufacturer, a molder and a moldmaker.

14. The method of claim 12 further comprising:
maintaining the second remote record as an automated e-mail on a remote e-mail server.

15. The method of claim 11 further comprising:
generating an activity report from the second remote record only following a request from at least one of an OEM manufacturer, a molder and a moldmaker.

16. The method of claim 15 further comprising:
providing the report to the moldmaker following a request from the OEM manufacturer.

17. The method of claim 10 further comprising:
recording a recent average cycle time and a recent activity percentage based on a predetermined session period.

18. The method of claim 10 further comprising:
recording a release signal when the mold is open and an active signal when the mold is closed;
recording a duration of time of each of the release signal and the active signal.

19. The method of claim 10 further comprising:
affixing a unique serial number to the monitor;
retrieving data regarding the mold remotely based upon entry of the unique serial number into a remote interface.

* * * * *